United States Patent
Incarnato et al.

(10) Patent No.: US 6,909,783 B2
(45) Date of Patent: Jun. 21, 2005

(54) ALPHABET SOUP CRYPTOGRAPHY

(76) Inventors: Joseph Samuel Incarnato, 1008 Tracy Dr., Silver Spring, MD (US) 20904; William Martin Auslander, 1706 Sadlers Wells Dr., Herndon, VA (US) 20170

( * ) Notice: Subject to any disclaimer, the term of this patent is extended or adjusted under 35 U.S.C. 154(b) by 0 days.

(21) Appl. No.: 10/626,074

(22) Filed: Jul. 24, 2003

(65) Prior Publication Data

US 2004/0101134 A1 May 27, 2004

Related U.S. Application Data

(63) Continuation-in-part of application No. 10/054,396, filed on Jan. 24, 2002, now abandoned, which is a continuation-in-part of application No. 09/429,087, filed on Oct. 29, 1999, now abandoned.

(51) Int. Cl.[7] .............................. G09C 1/06; G09C 3/08; H04K 1/04; H04K 1/06; H04L 9/00
(52) U.S. Cl. .............................. 380/56; 380/37; 380/51; 380/268
(58) Field of Search .............................. 380/37, 51, 56, 380/268

(56) References Cited

U.S. PATENT DOCUMENTS

| | | | | |
|---|---|---|---|---|
| 1,556,964 A | * | 10/1925 | Scherbius | ..................... 380/51 |
| 4,668,103 A | * | 5/1987 | Wilson | ..................... 380/30 |
| 4,675,477 A | * | 6/1987 | Thornwall | ..................... 380/267 |
| 4,847,861 A | * | 7/1989 | Hamatsu et al. | ..................... 375/142 |
| 5,533,127 A | * | 7/1996 | Luther | ..................... 380/28 |
| 5,596,516 A | * | 1/1997 | Higashi et al. | ..................... 708/252 |
| 6,445,797 B1 | * | 9/2002 | McGough | ..................... 380/285 |

OTHER PUBLICATIONS

Gaines, "Cryptanalysis," 1939, pp. 108–111,142,143,146, 147,169–173.*

* cited by examiner

*Primary Examiner*—Gregory Morse
*Assistant Examiner*—Matthew Heneghan

(57) ABSTRACT

Computer methods, systems, and devices, providing automatic permutations of a programmed modified random symbol square matrix producing one time pad messages are disclosed enabling messages to be encrypted from plain text which is typed into a computer thereby selecting random symbols from the matrix. Typing in text in a continuous stream yields a continuous stream of enciphered symbols. The input into a computer via an input device activates a computer program driven device called a sliding scale whose function is to select random symbols from the matrix. The sliding scale responds to the program containing the applicable algorithms for encryption and decryption. Initiating input into the computer requires the selection of an entry point to activate the algorithms given in the Appendix herein. In the 96×96 Square described, there are 9216 entry points yielding many individual alphabets from which to select random symbols.

7 Claims, 7 Drawing Sheets

Fig.1 VIGENERE SQUARE MATRIX

ALPHABET SOUP CRYPTOGRAPHY

This application is a Continuation In Part of application Ser. No. 10/054,396 filed Jan. 24, 2002, now abandoned, which in turn was a Continuation In Part of application Ser. No. 09/429,087 filed Oct. 29, 1999, now abandoned.

STATEMENT REGARDING FEDERALLY SPONSORED RESEARCH AND DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the invention

U.S. Class 380—Cryptography:—The study of secret information storage or communication.

U.S. Class 178—Telegraphy:—Means for transmitting messages, the elements of the messages being selected or composed at will, according to a prearranged code (2) Description of the Related Art including information disclosed under 37 CFR 1.97 and CFR 1.98:

Thornwall, U.S. Pat. No. 4,675,477; "Electronic Devices Providing Automatic Permutations of a Vigenere Square"

Helen Fouche Gaines, "Cryptanalysis—A Study of ciphers and their solutions"

BRIEF SUMMARY OF THE INVENTION

This invention provides an improved method, system, and devices for encrypted data processing including encryption, and decryption. It relates to computer systems containing devices that have installed therein programmed encryption methods which will yield an encrypted 'one time-pad' message by automatically selecting symbols from a modified Vigenere Square matrix containing randomly scrambled alphabets, numbers and symbols. Alphabet Soup produces one time pad messages in that it composes encrypted messages of totally random symbols. This is done by typing literal script into a computer containing the Alphabet Soup encryption and decryption programs. Traditional one time pads are slow and cumbersome. Alphabet Soup moves at the speed of the capability of the typist. This invention allows anyone with computer capabilities to compose one time pad messages which were once the purview of cryptographers and cryptanalyists. It gives them the ability to decrypt encoded messages in an almost instantaneous operation that once was extremely time consuming. Anyone with an Alphabet Soup system can encrypt voluminous data files at whatever speed the typist is capable of. Decryption of these data files is even quicker. The inventive concept consists of a unique method for data encryption embodied in a computer program written in a high level computer language incorporating the capabilities of producing and communicating a one time pad message without all of the associated problems of transmission, or the clumsiness of composition and decryption. The savings in time, advance in capabilities, and use by individuals not in the world of cryptography make this a user friendly desirable acquisition. The decryption process is the reverse of the encryption-process. The algorithms for these processes are contained in Appendix 1, and 2, herein, with their attendant flow charts, FIG. 6, and FIG. 7.

BRIEF DESCRIPTION OF THE SEVERAL VIEWS OF THE DRAWING(S)

Figure 3:
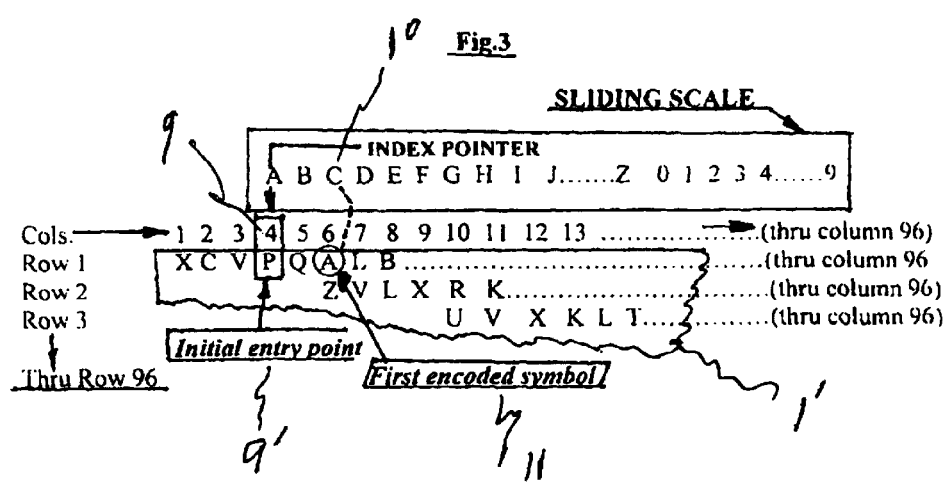
Figure 4:
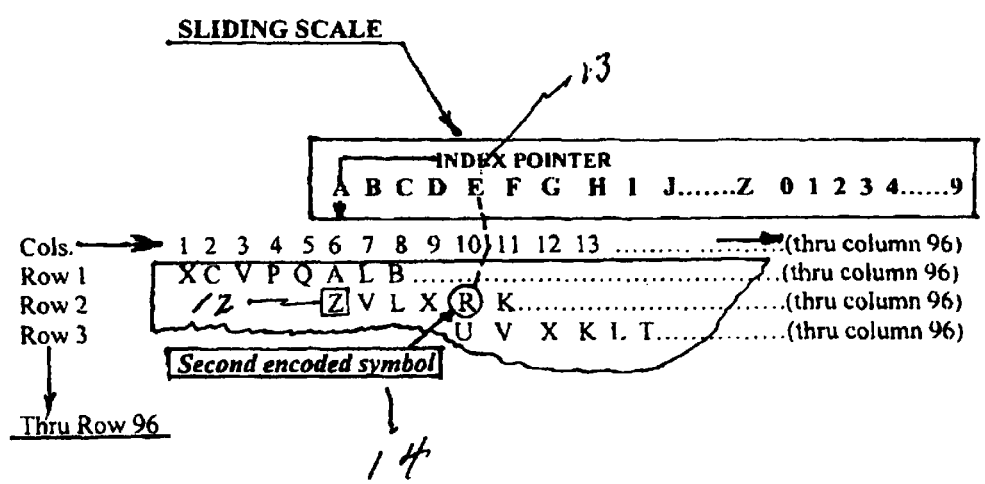
Figure 5:
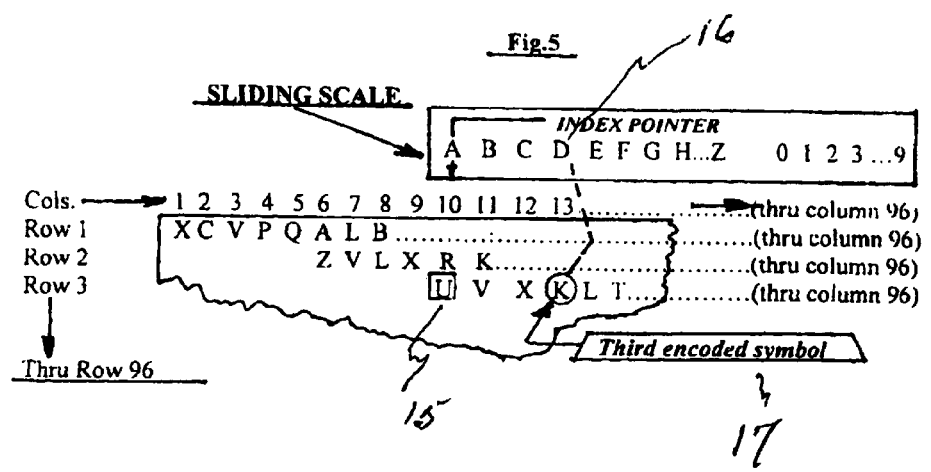

FIGS. 3, 4, and 5 constitute a fragmentary schematic diagram of the Matrix 1' with Sliding Scale and Index Pointer.

FIG. 3 illustrates the selection of the first symbol of the encoded message.

FIG. 4 illustrates the selection of the second symbol of the encoded message.

FIG. 5 illustrates the selection of the third symbol of the encoded message.

Figure 6:
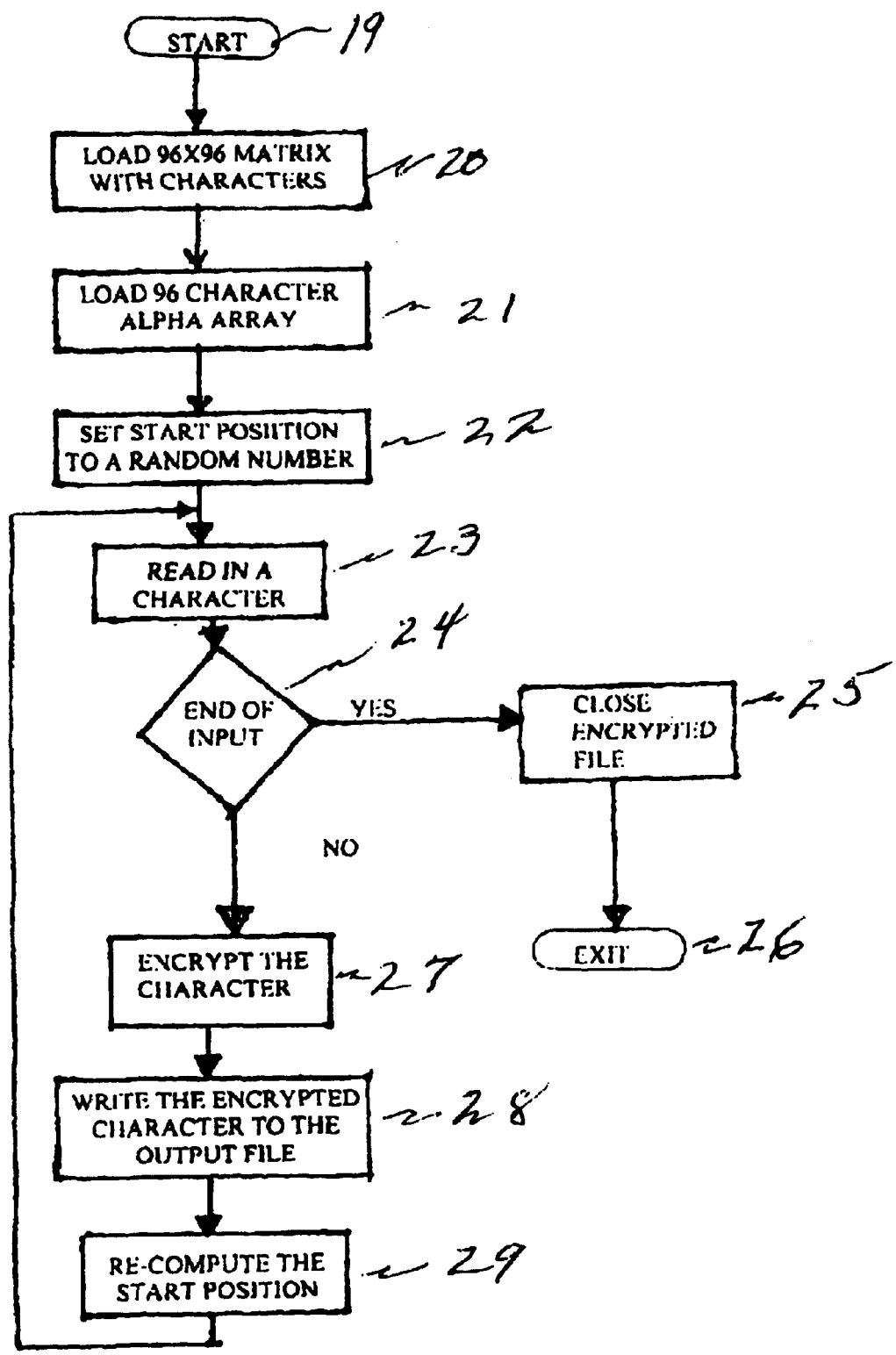

FIG. 6 is a flow diagram of the method for converting literal characters of a national language into encrypted symbols to be contained in an encrypted message, illustrating operation of the algorithm in Appendix 1.

Figure 7:
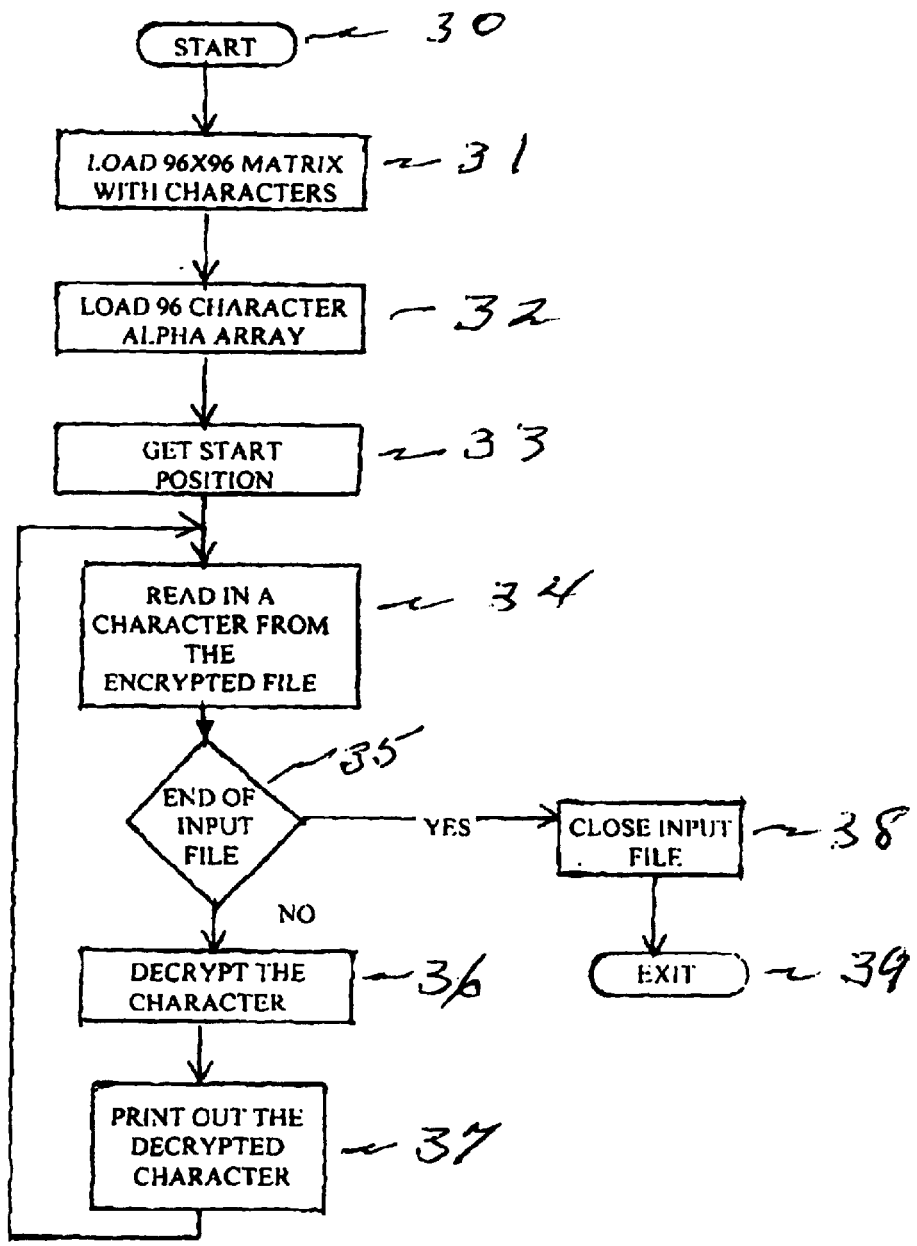

FIG. 7 is a flow diagram of the method for converting encrypted symbols into the national language from which the encrypted message was derived illustrating the operation of the algorithm in Appendix 2.

DETAILED DESCRIPTION OF THE PREFERRED EMBBODIMENT OF THE INVENTION

This invention consists of the following components:

a) a matrix containing totally randomized symbols consisting of the upper and lower case English alphabets, the numerals 0–9 and all the non-literal symbols on the 104 keys of an expanded computer keyboard which includes the carriage return (enter) and the space bar, i.e. 26+26+10+32+2=96 symbols in this implementation. These 96 symbols are scrambled randomly and laid out in strings, or rows, of which there are 96 forming a 96×96 matrix. The matrix is divided into 9216 cells which are numbered consecutively from 1 in the upper left hand corner to 9216 in the lower right hand corner. Each of these squares contains a random alphabet letter, a numeral, a symbol, or a carriage return or space bar. Activation of any of these 'symbols' including the space bar or the carriage return via a computer keyboard will yield an encrypted 'symbol' in an encrypted message. Blank spaces in the encrypted message will indicate an encrypted symbol. It is not necessary that the matrix consist of a 96×96 square. It can be expanded or compressed to a different size depending on the languages used.

b) the second component is a device called a Sliding Scale. This device is separate from the matrix and acts independently of it moving from left to right, or right to left, and vertically, either in a downward or upward motion in relation to the matrix. It contains on it's face all of the alphabets, numerals and symbols including spaces for the space bar and carriage return arranged systematically, A . . . Z, a . . . z, 0 9, ~ . . . 1. It also has mounted on it an Index Pointer used for positioning the Sliding Scale over an entry point into the matrix for the purpose of selecting encrypted characters from the matrix.

c) The third component is the high level computer code contained herein as Appendixes 1 and 2, for encryption and decryption. This code may be installed in the memory of a hard drive of a variety of computers, on floppy disks or other storage media of various types for use in computers. It should be noted that the above description of components is by way of explanation of their characteristics, they exist only in the computer code of the Appendixes.

The present invention may be implemented in a variety of ways using both hardwired, and wireless systems. It can utilize the variety of operating systems available in a multiplicity of computers such as personal computers, mid-range, mainframe, or super-computers. The invention consists of a unique method for producing "one time pad" messages utilizing the computer code of Appendixes 1, and 2, which can be installed on a variety of computer drives or disk devices. These can be used for transmission of encrypted data, or secure storage of sensitive information in computer memory or other computer storage media. The computer code in the Appendixes contain the all the attributes of the randomized matrix and those of the Sliding Scale, these being activated by the Appendixes. The above cited algorithms are used to compose encrypted messages known as "one time pads" in extremely rapid fashion and decrypts these messages also, in a rapid and timely manner.

Figure 1:
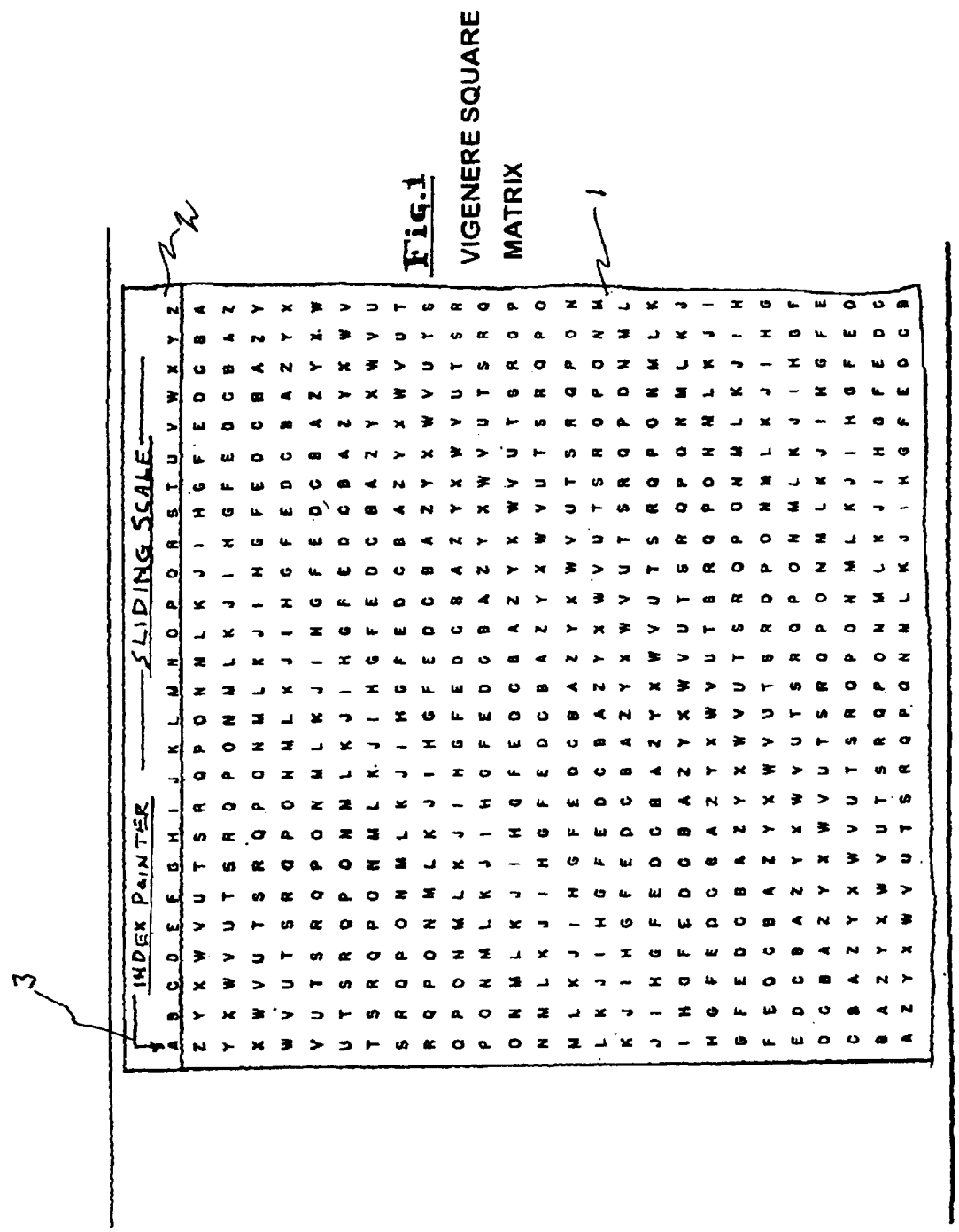
FIG. 1 is a plan view of Vigenere Square Matrix with Sliding Scale and Index Pointer.

Referring to the drawings, FIG. 1. is a Vigenere Square matrix 1, used herein only to illustrate the initial positioning of the Sliding Scale with respect to a matrix with a horizontal row outside and across the top of the matrix 2. This outside row, hereinafter called the Sliding Scale 2 is a separate device from the matrix 1 and is shown with an affixed index pointer 3. The sliding scale 2, with its affixed index pointer 3 moves as one complete unit, independently of the randomized matrix 1', but in coordination with it as directed by the computer programs, Appendixes 1, and 2, installed in computer memory, or removable and transportable floppy disks. It can move left to right or right to left and vertically in either direction. The actions and motions of, and the literal message characters of the sliding scale 2 are contained in the computer programs, Appendixes 1, and 2, which direct the Sliding Scale's coordinated interaction with the matrix 1'. These literal encrypted characters are also contained in the computer programs, Appendixes 1 and 2.

FIG. 2, FIG. 3, FIG. 4, and FIG. 5, are all abbreviated schematics of a modified random matrix 1', each with an attendant Sliding Scale 2 and its appended Index Pointer 3. They indicate the size of the present invention, being comprised of 96 rows, 4, 5, 6, and 96 columns, 7. In practice except as described herein each of these rows, 4, 5, 6, and columns 7 of the matrix 1' contain the same characters, except randomly scrambled, as those on the sliding scale 2, which are not scrambled but arranged systematically. FIGS. 6 and 7 are flow charts illustrating encryption and decryption programmed in Appendixes 1 and 2.

Figure 2:
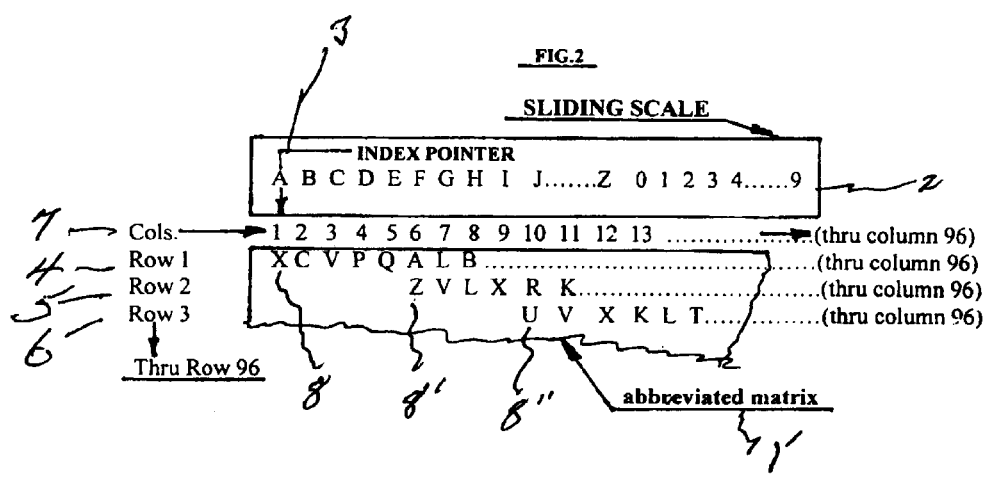
FIG. 2 is a fragmentary schematic of a modified Matrix 1' with Sliding Scale and Index Pointer.

It is not necessary that the message characters of the sliding scale 2 be of the same language as those in the matrix 1'. The languages may vary, i.e., the sliding scale 2 in English and the matrix 1' characters in Sanskrit, or the sliding scale 2 in Russian and the matrix 1' in Japanese ideograms. The national language to be encrypted is present on the sliding scale 2, and the encrypted characters are present in the matrix 1'. The combinations are many and varied wherein the sliding scale 2 and the matrix 1' may each correspond to characters of differing written languages. FIG. 2. in its rendition is only an illustrative example of an English representation of a matrix 1' The scrambled symbols of the matrix 1' lie in consecutively numbered cells of the matrix 1' which are numbered from 1 to 9216, each of these cells being a potential entry point into the matrix.

In FIG. 2, Column 1, row 1, contains an X, 8; Column 8, row 2, contains an L, 8'; Column 11, row 3, contains a V, 8". In practice all rows and columns shall contain encryption symbols, and non-symbols, such as the spacer and the carriage return present on a keyboard. These non-symbols are represented both on the sliding scale, 2, and in the matrix 1', both appearing in encrypted messages as encrypted symbols and not as spacers between groups of words. In conjunction with the Sliding Scale 2 and as indicated in FIGS. 3, 4, and 5, messages of any length and complexity can be constructed based on programmed software as directed by the Algorithms given in Appendixes 1, and 2.

Referring to FIG. 3. illustrates the initiation of encoding a message by selection of an entry point 9, the $4^{th}$ cell of the matix,1', and overlaying the sliding scale 2 with its appended index pointer 3 above the entry point 9, in row 1, which is within the matrix 1', which contains the letter P, 9'. Moving laterally along the Sliding Scale 2 the first letter of the message to be encoded is C, 10, residing on the sliding scale 2. The symbol beneath it and being in the same row as the entry point (number 4 in row 1) of the matrix 1' is A 11, which is the first encoded symbol of the encoded message. Although this initial entry point 9 chosen is in row 1, any entry point from 1 to 9216 may be chosen in any of the 96 rows. Referring to FIG. 4. illustrates the choosing of the second encrypted symbol of the encrypted message. Move the sliding scale 2 down one row to the next row, 5, (row 2),which is immediately beneath the row 1, 4 from which the first encrypted symbol 11, of the message was picked. The symbol beneath the initial encoded A 11 of the matrix is Z, 12 being in row 2, 5, lying in Column 6. Position the sliding scales index pointer 3 over the symbol Z, 12 in this second row 5, which is immediately below the A 11 which was chosen as the first encoded symbol of the message. The second letter of the message to be encoded is an E, 13. Move laterally down the sliding scale 2 to the letter E, 13 on it. The symbol beneath it, being in the second row 5 of the matrix 1', is the symbol R, 14 (in row 2) and lying in Column 10, which is the second encoded symbol 14 of the encrypted message.

Referring to FIG. 5. illustrates the choosing of the third encrypted symbol of the encrypted message. Move the sliding scale 2 down one row to the next row 6, (row 3) which is immediately beneath row 2, from which the second encrypted symbol 14 of the message was picked. The symbol beneath the second encrypted symbol R 14, in row 3, 6, is U, 15, lying in Column 10. Position the sliding scale's 2 index pointer 3 above the U, 15 in row 3, (the symbol below the R symbol in row 2) and move laterally along the sliding scale 2 to third letter to be encrypted, being in row 3, which is D, 16 on the sliding scale 2. The symbol beneath the D 16 of the sliding scale 2, being in the third row 6 is a K 17 which is the third encrypted symbol of the encrypted message, lying in Column 13. Thus the letters CED are encrypted to the symbols ARK. Choosing different initial entry points other than 4 with its symbol P, 9, would yield many variations of the encoded ARK.

Each succeeding symbol of the encrypted message is chosen in the same manner by moving from entry point to entry point.

It is evident that choosing a different initial entry point will yield a different encrypted message with many possible variations.

It should be noted that if an entry point is chosen such that the sliding scale extends beyond the end of a row, the sliding scale wraps back to the beginning of the same row.

While the invention has been shown and described with reference to a preferred embodiment, it will be understood by those skilled in the art that various changes in form and detail may be made without departing from the spirit and scope of the invention. Further objects and features of this invention will be apparent to those skilled in the art when considered in conjunction with the accompanying drawings.

In FIG. 6 and FIG. 7, the annotated numerals therein correspond to annotated numerals contained in the Appendixes.

With reference now to FIG. 6, and FIG. 7 there are depicted high level flow diagrams of the method of converting a literal alphabetic character, numeral, or symbol, into an encrypted symbol, FIG. 6, or decryption of encrypted symbols, FIG. 7 in accordance with the preferred embodiment of this invention. The computer program called Alphabet Soup, defined in the Appendixes 1 and 2 perform these functions. This program is contained either in a computer system memory or other computer media devices. The encryption process begins at start, 19. Items 20 and 21 of the flow chart are contained in the activated computer program. Selection of an entry point into matrix containing randomly scrambled alphabets, numerals, and symbols is the next step, 22. Step 23 accepts the character to be encrypted. Step 24 is an IF statement in computer code. If no more characters are to be encrypted and is the end of input then close the encrypted file and exit the program, steps 28 and 29. If there are further characters to be encripted, encript the character 25 and write the character to the output file 26. Re-compute a new start position 27 and loop back to reading in a new character 23. This process continues as long as new characters to be encrypted are input to the computer code.

With regard to FIG. 7, decryption of en encrypted message is defined in Appendix 2. Repeat steps 19, 20, and 21 which are listed as steps 30, 31, and 32. Step 33 inputs the start position, or entry point, of the encryption process. Read in an encrypted character 34 from the encrypted message. Step 35 is an IF statement in the computer code. If no more characters are to be read in from the encrypted message and we have come to the end of input file 35, close the decrypted input file 38 and exit the program 39. If there are further characters to be decrypted 36, print out the decrypted character 37, loop back to read in the next character from the encrypted file 34. This process continues as long as new characters to be decrypted are input to the computer code.

It is important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include but are not limited to recordable type media such as floppy disks or CD-ROMS, or computer tapes, and transmission type media such as analogue or digital communications links, both hard wired and wireless.

APPENDIX 1

Encryption Algorithm
PSEUDO CODE FOR ALPHABET SOUP

/* The Encryption algorithm reads in characters from a terminal, encrypts them and writes them out to an output file. When a Control-D character is typed, then the message is considered complete. */
Begin //(~19)

APPENDIX 1-continued

Encryption Algorithm
PSEUDO CODE FOR ALPHABET SOUP

```
char matrix[9216]; /* The matrix of 96 rows of 96 characters */
/* Fill 96 x 96 matrix with characters */ // (~20)
matrix[0] = 'Y';
matrix[1] = 'p';
...
matrix[9214] = 'x';
matrix[9215] = '&';
/* Fill alpha_array with the 96 characters */ // (~21)
alpha_array[0] = 'A';
alpha_array[1] = 'B';
...
alpha_array[94] = ' ';
alpha_array[95] = '<cr>';
start_pos = X; /* start position is a random number X */ // (~22)
entry_pt = X;
algorithm = start_pos/9216; /* algorithm = start_pos div 9216 */
start_pos = start_pos - (algorithm* 9216);
while not end of input(CTRL-D)
    loop
    read a character ch // (~23)
    if (ch == CTRL_D) // (~24)
        exit loop;
    if (algoithm == 0) // (~25)
    start_pos = get_en_pos_0(ch, &start_pos);
    else if (algorithm == 1)
        start_pos = get_en_pos_1(ch, &start_pos);
    ...
    else if (algorithm == 7)
    start_pos = get_en_pos_7(ch, &start_pos);
/* write to output file the encrypted character */
/* matrix[start_pos] is the encrypted character */
    fwrite(matrix[start_pos]); // (~26)
    if (algoithm == 0)
        start_pos = start_pos + 96 + (entry_pt mod 96);
    else if (algorithm == n)
    ...
    if (start_pos > 9215)
    start_pos = start_pos - 9216; /* wrap back around to
    the beginning */ // (~27)
    end loop
close output file // (~28)
end // (29)
/* This is the get_en_pos_0 routine for algorithm 0. .. */
/* A number between 0 and 95 is returned, representing one of 96
characters */
int get_en_pos_0(ch, start_pos)
begin
start_pos = start_pos / 96; /* get to the starting row */
if (ch <= 'Z') and (ch >= 'A')
    tmp_pos = ch - 'A' /* tmp_pos = 0..25 */
else if (ch <= 'z') and (ch >= 'a')
    tmp_pos = 26 + (ch - 'a'); /* tmp_pos = 26..51 */
else if
...
else if (ch == ' ')
    tmp_pos = 94;
else if (ch == '<cr>')
    tmp_pos = 95;
tmp_pos = tmp_pos + start_pos;
new_row = tmp_pos / 96;
if (new_row > start_row)
    tmp_pos = tmp_pos - 96;
return tmp_pos
end
```

APPENDIX 2

Decryption Algorithm

```
/* The Decryption algorithm reads in characters from an input file, decrypts them and */
/* writes them out to a terminal screen. */
Begin // (~30)
char alpha_array[96];   /* The array that holds the 96 printable characters */
char matrix[9216];      /* The matrix of 96 rows of 96 characters */
/* Fill 96 x 96 matrix with characters */ // (~31)
matrix[0] = 'Y';
matrix[1] = 'p';
...
matrix[9214] = 'x';
matrix[9215] = '&';
/* Fill alpha_array with the 96 characters */ // (32)
alpha_array[0] = 'A';
alpha_array[1] = 'B';
...
alpha_array[94] = ' ';
alpha_array[95] = '<cr>';
start_pos = X; /* start position is a random number X */ // (~33)
entry_pt = X;
algorithm = start_pos / 9216; /* algorithm = start_pos div 9216 */
start_pos = start_pos - (algorithm* 9216);
while not end of input file // (~35)
   loop
   read a character ch // (~34)
   if (algoithm == 0)
      call get_de_pos_0(&offset, &start_pos, ch); // (~36)
   else if (algorithm == 1)
      call get_de_pos_1(&offset, &start_pos, ch);
   ...
   else if (algorithm == 7)
      call get_de_pos_7(&offset, &start_pos, ch);
/* alpha_array[offset] is the decrypted character */
   printf("%c", alpha_array[offset]); // (~37)
   end loop
close input file // (~38)
end // (~39)
/* This is the get_de_pos_0 routine for algorithm 0. There are 8 different algorithms. */
/* A offset into the alpha_array is returned which represents one of 96 characters. */
/* An updated start_pos is also returned */
void get_de_pos_0(offset, start_pos, ch)
begin
offset = 0;
row = start_pos / 96; /* get to the starting row */
i = start_pos;
   loop
   new_row = i / 96;
   if(new_row > row)
      i = i - 96;  /* wrap around to next row */
   if(matrix[i] == ch)
      exit loop;   /* found the match */
   offset = offset + 1;
   i = i + 1;
   end loop
start_pos = i + 96 + (entry_pt mod 96);
if(start_pos > 9215)
   start_pos = start_pos - 9216; /* wrap around to the beginning */
      end
```

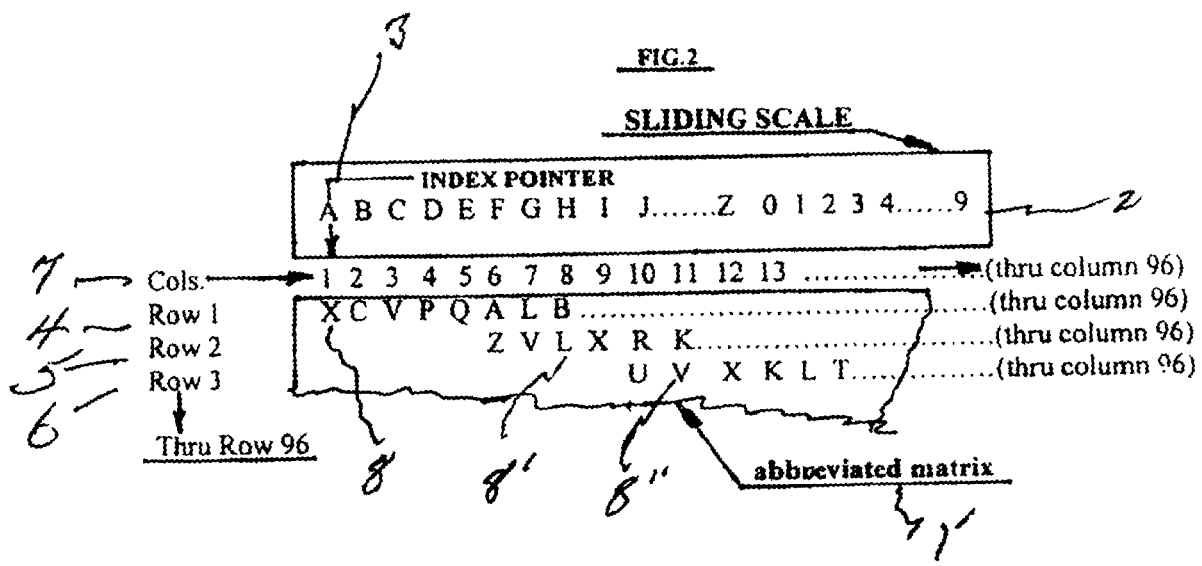

We claim:

1. A method for using a fixed-length one-one pad for sending a variable-length enciphered transmission of a message in a first alphabet consisting of n distinct symbols to a recipient using a second alphabet consisting of n distinct symbols, the method comprising:

distributing identical matrices to both a sender and a recipient, wherein the matrix consists of m rows and n columns, wherein each row in the matrix contains every symbol of the second alphabet, and wherein the symbols of the second alphabet are randomly distributed in each row;

distributing identical symbol arrays to both the sender and the recipient, wherein each array consists of n elements, and wherein each array contains every symbol of the first alphabet;

selecting an initial row index and an initial column index corresponding to a symbol in the matrix;

setting a current row index to the initial row index and a current column index to the initial column index;

for each symbol in the message and in a corresponding ciphertext, adding the symbol's position in the array to the current column index, subtracting n from the current column index if it no longer corresponds to a valid matrix column, setting the ciphertext symbol to the symbol in the matrix at the current row index and current column index, incrementing the current row index, and subtracting m from the current row index if it no longer corresponds to a valid matrix row;

sending the ciphertext, the current row index, and the current column index to the recipient.

2. The method of claim 1, wherein the matrix contains an equal number of rows and columns.

3. The method of claim 1, wherein the matrix contains 96 rows.

4. The method of claim 1, wherein the matrix contains 96 columns.

5. The method of claim 1, wherein the first alphabet and the second alphabet are the same.

6. The method of claim 1, wherein the first alphabet comprises a carriage return symbol and a space bar symbol.

7. The method of claim 1, wherein the second alphabet comprises a carriage return symbol and a space bar symbol.

* * * * *

UNITED STATES PATENT AND TRADEMARK OFFICE
CERTIFICATE OF CORRECTION

PATENT NO. : 6,909,783 B2  
APPLICATION NO. :10/626074  
DATED : June 21, 2005  
INVENTOR(S) : Joseph S. Incarnato and William A. Auslander It is certified that error appears in the above-identified patent and that said Letters Patent is hereby corrected as shown below:

In the Claims:

Claim 1, col. 7 line 54, change "one" (second occurrence) to --time--.

In the Drawings:

Substitute the attached Fig. 2 for Fig. 2 in the patent.

Signed and Sealed this

Eighteenth Day of March, 2008

JON W. DUDAS  
*Director of the United States Patent and Trademark Office*